United States Patent [19]

Torrence

[11] Patent Number: 4,638,973
[45] Date of Patent: Jan. 27, 1987

[54] INLINE SOLENOID OPERATED SLIDE VALVE

[75] Inventor: Robert J. Torrence, Addison, Ill.

[73] Assignee: Eaton Corporation, Cleveland, Ohio

[21] Appl. No.: 798,100

[22] Filed: Nov. 14, 1985

[51] Int. Cl.[4] .............................................. F16K 31/06
[52] U.S. Cl. ........................... 251/129.02; 251/129.21
[58] Field of Search ....................... 251/129.21, 129.02

[56] References Cited

U.S. PATENT DOCUMENTS

| 2,677,524 | 5/1954 | Parsons | 251/129.21 |
| 2,863,473 | 12/1958 | Gantz | 251/129.21 X |
| 3,285,285 | 11/1966 | Bielefeld | 251/129.21 X |
| 4,529,165 | 7/1985 | Lehrach | 251/129.21 X |

Primary Examiner—Arnold Rosenthal
Attorney, Agent, or Firm—D. A. Rowe; R. A. Johnston

[57] ABSTRACT

An inline solenoid operated fluid flow control valve has a valve slide arrangement which eliminates physical contact and impact between the flow control surfaces.

4 Claims, 4 Drawing Figures

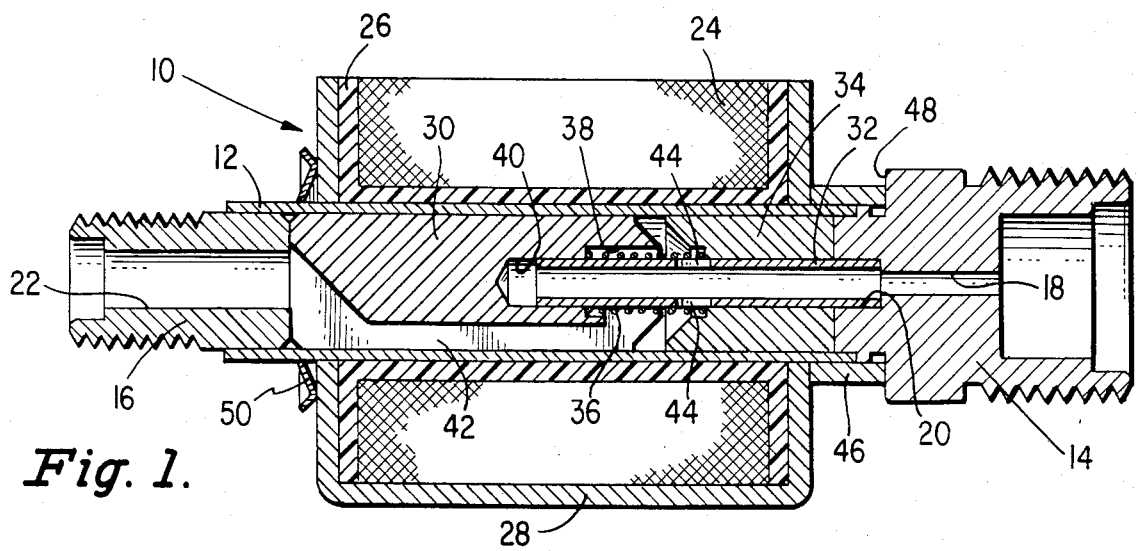
Fig. 1.
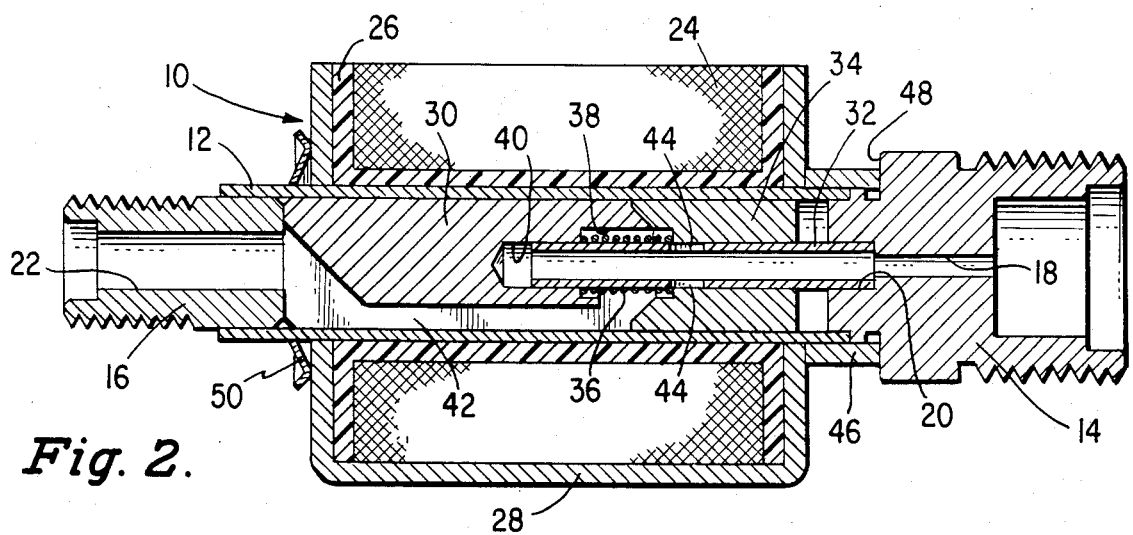
Fig. 2.
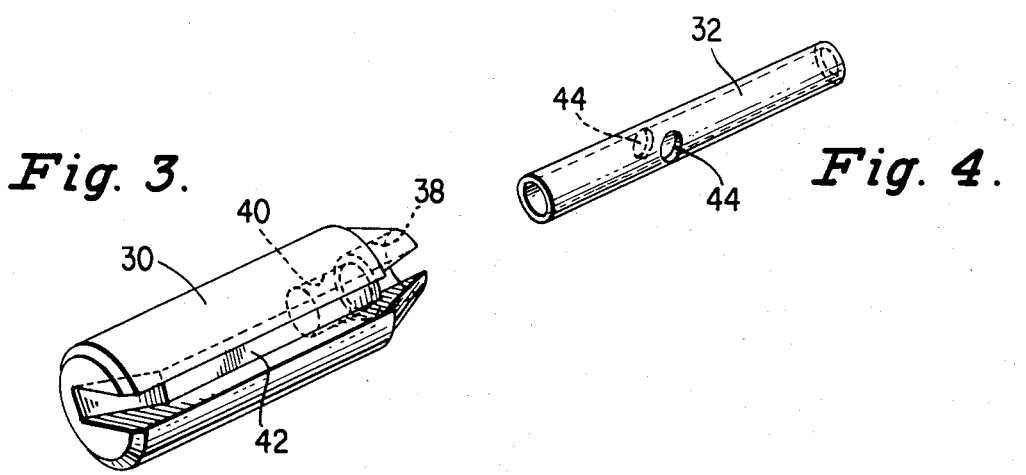
Fig. 3.
Fig. 4.

INLINE SOLENOID OPERATED SLIDE VALVE

BACKGROUND OF THE INVENTION

This invention relates to solenoid operated valves and, more particularly, to such a valve wherein the solenoid surrounds the flow line and which is adapted for pulsed operation.

Automotive air conditioning systems in the past typically utilized either a thermostatic expansion valve or an orifice to control the flow of refrigerant to the evaporator. While such systems operated generally satisfactorily, the amount of control thereover was minimal. Since automotive control systems have become increasingly more sophisticated, with onboard microcomputers being provided for controlling such functions as engine speed, fuel flow, fuel mixture, transmission ratio, etc., it has been proposed to utilize an electrically operated expansion valve under control of the onboard microcomputer in the air conditioning system. Such valves are typically controlled in a pulse width modulated manner, which requires that the valves be pressure balanced to avoid placing an undue load on the automotive electrical system, which would occur if the valve operator had to open the valve under a differential pressure of at least 300 psi, which is typical in an automotive air conditioning application. Satisfactory results have been achieved in the past with a valve design wherein the solenoid extends outward at a right angle from the refrigerant fluid flow line with the motion of the solenoid plunger, which typically includes the valve member, being at right angles to the fluid flow. While such a valve operates in a satisfactory manner, under certain applications it is desirable to have what is referred to as an inline valve, where the control solenoid surrounds the flow line. Such a valve is advantageous because it results in a smaller overall package and its operation is quieter than a right angle valve. It is therefore an object of this invention to provide such a valve.

Prior constructions of inline solenoid operated valves have utilized a conical plunger which contacts a valve seat. A problem encountered with this type of arrangement is that mechanical wear due to the impact of the plunger against the seat degrades the valve performance. With the pulse width modulation control systems which are utilized in automotive air conditioning systems, a valve must last, on the average, for sixty million cycles. The impact of the plunger against the valve seat, and the resulting wear, is generally the limiting factor in valve life. It is therefore a further object of this invention to provide an inline solenoid operated valve wherein physical contact and impact between the flow control surfaces is eliminated.

SUMMARY OF THE INVENTION

The foregoing, and additional, objects are attained in accordance with the principles of this invention by providing an electrically operated fluid flow control valve comprising a hollow cylindrical valve sleeve, a pair of fittings fixedly mounted one on each end of the valve sleeve for coupling the valve into a fluid flow line, the fittings each having an internal fluid flow conduit, a first of the fittings having a counterbore extending part way into the conduit of the first fitting from the end of the first fitting which is mounted on the valve sleeve, an electrical coil surrounding the valve sleeve between the fittings, a magnetic pole piece fixedly secured within the valve sleeve and extending from the second of the fittings inside the region defined by the coil, the pole piece having a stepped counterbore extending part way into the pole piece from the end of the pole piece remote from the second fitting, the pole piece further having a longitudinal exterior channel extending the length of the pole piece, the channel intersecting the open end of the counterbore and communicating with the conduit of the second fitting, a hollow tube member secured at one end in the counterbore of the first fitting and at the other end extending into the small step of the counterbore of the pole piece, the tube member having a valve port in its wall, a magnetic plunger surrounding the tube member and slideable thereon to selectively cover and expose the valve port, and spring means for yieldably biasing the plunger away from the pole piece.

In accordance with an aspect of this invention, the inside dimension of the plunger is sufficiently greater than the outside dimension of the tube member so that the clearance between the plunger and the tube member provides a controlled minimum flow path when the valve port is covered, the clearance providing a smaller flow area than the valve port.

BRIEF DESCRIPTION OF THE DRAWINGS

The foregoing will be more readily apparent upon reading the following description in conjunction with the drawings in which like elements in different figures thereof have the same reference character applied thereto and in which:

FIG. 1 is a longitudinal cross sectional view of an electrically operated valve according to the present invention, with the coil being deenergized;

FIG. 2 is a view similar to FIG. 1 showing the state of the valve with the coil being energized;

FIG. 3 is a perspective view of the pole piece of the valve shown in FIG. 1; and FIG. 4 is a perspective view of the tube member of the valve shown in FIG. 1.

DETAILED DESCRIPTION

Referring to the drawings, the valve shown therein and designated generally by the reference numeral 10 includes a hollow cylindrical valve sleeve 12 and a pair of fittings 14 and 16, one on each end of the valve sleeve 12, for coupling the valve 10 into a fluid flow line. The first fitting 14 has an internal fluid flow conduit 18 which is counterbored at 20 part way therein from the end of the fitting 14 which is mounted on the valve sleeve 12. The second fitting 16 has an internal fluid flow conduit 22. Preferably, the conduits 18 and 22 and the counterbore 20 are in axial alignment with the valve sleeve 12.

The valve 10 also includes an electrical coil 24 wound on a bobbin 26 and surrounding the sleeve 12 between the fittings 14 and 16. As is conventional, a magnetic yoke 28 surrounds the coil 24 to provide a return path for the magnetic flux generated by the coil 24 when electrical current is passed therethrough.

The operative elements of the valve 10 are within the sleeve 12 and include a magnetic pole piece 30, a tube member 32, a magnetic plunger 34, and a spring 36. The pole piece 30 is secured within the sleeve 12 and has one end abutting the fitting 16, with the remainder of the pole piece 30 extending inside the region defined by the coil 24. The pole piece 30 has a stepped counterbore 38, 40, extending part way therein from the end of the pole piece 30 remote from the fitting 16. The pole piece 30 is further formed with a longitudinal exterior channel 42 which extends the length of the pole piece 30. At the ends of the pole piece 30, the channel 42 is enlarged to communicate with the conduit 22 of the fitting 16 and to intersect the open end of the counterbore 38.

The tube member 32 is secured at one end in the counterbore 20 of the fitting 14 and at the other end extends into the small counterbore 40 of the pole piece 30. The tube member 32 is formed with a valve port 44 in its wall. The magnetic plunger 34 surrounds the tube member 32 and is slideable thereon to selectively cover and expose the valve port 44. The spring 36 is a compression spring which surrounds the tube member 32 between the pole piece 30 and the plunger 34 and functions to yieldably bias the plunger 34 away from the pole piece 30.

To assemble the valve 10, the fitting 16 and the pole piece 30 are press fit into the sleeve 12, with the pole piece 30 abutting the fitting 16. A weld secures and seals the fitting 16 to the sleeve 12. The tube member 32 is then press fit into the counterbore 20 of the fitting 14. The plunger 34 and the spring 36 are then slid over the tube member 32. This assembly is then slid into sleeve 12, with the other end of the tube member 32 being inserted into the counterbore 40 and the spring 36 fitting within the counterbore 38. A weld then secures the fitting 14 to the sleeve 12. The spacer 46 is slid over the fitting 16 and over the sleeve 12 to abut the shoulder 48 of the fitting 14. The coil 24, bobbin 26, and magnetic yoke 28 are then slid over the sleeve 12 to abut the spacer 46. The retaining ring 50 then secures all the components in place.

The operation of the valve 10 is as follows, assuming that the valve 10 is arranged so that the fitting 16 is the inlet fitting and the fitting 14 is the outlet fitting. With the coil 24 not energized, the valve 10 is normally open, as shown in FIG. 1. Thus, the spring 36 acts to move the plunger 34 away from the pole piece 30, this motion being limited by the outlet fitting 14. Fluid then flows through the conduit 22 of the inlet fitting 16, through the channel 42 of the pole piece 30, through the space between the pole piece 30 and the plunger 34, through the valve port 44, through the interior of the tube member 32, and through the conduit 18 of the outlet fitting 14. Upon energizing the coil 24, the plunger 34 is magnetically attracted to the pole piece 30, compressing the spring 36 within the large counterbore 38, as shown in FIG. 2. In this state, the valve port 44 is covered, restricting fluid flow through the valve 10. However, a minimum flow rate is maintained by the clearance between the plunger 34 and the tube member 32, this clearance providing a smaller flow area than the valve port 44. This minimum flow rate allows a sufficient flow of refrigerant to carry lubrication oil back to the system's compressor. Subsequent deenergization of the coil 24 allows the spring 36 to force the plunger 34 back to the position shown in FIG. 1, creating a full flow condition once again.

The aforedescribed valve possesses a number of advantages. The valve is capable of opening and closing rapidly, at about 10 cycles per second, allowing for modulation of the flow rate using an electronic pulse width controller. The flow control surface of the valve is a non-impact surface providing long life. In addition, since the components are in pressure and force balance, the friction of the components is low and a small coil, just large enough to overcome the return spring forces, can be used. This results in energy conservation, small weight and size, and low current drain which allows the electronics to control the valve without the need for a large power switching transistor.

Although the illustrative embodiment has disclosed a valve wherein the fitting 16 is the inlet fitting and the fitting 14 is the outlet fitting of a normally open valve, by moving the valve port 44 downstream of the plunger 34, the valve can be constructed as a normally closed valve with full flow upon energization of the coil. Additionally, the inlet and outlet fittings can be reversed.

Accordingly, there has been disclosed an improved inline solenoid operated slide valve. It is understood that the above-described embodiment is merely illustrative of the application of the principles of this invention. Numerous other embodiments may be devised by those skilled in the art without departing from the spirit and scope of this invention, as defined by the appended claims.

I claim:

1. An electrically operated fluid flow control valve, comprising:

a hollow cylindrical valve sleeve;

a pair of fittings fixedly mounted one on each end of said valve sleeve for coupling the valve into a fluid flow line, said fittings each having an internal fluid flow conduit, a first of said fittings having a counter bore extending part way into the conduit of said first fitting from the end of said first fitting which is mounted on said valve sleeve;

an electrical coil surrounding said valve sleeve between said fittings;

a magnetic pole piece fixedly secured within said valve sleeve and extending from the second of said fittings inside the region defined by said coil, said pole piece have a stepped counterbore extending part way into said pole piece from the end of said pole piece remote from said second fitting, said pole piece further having a longitudinal exterior channel extending the length of said pole piece, said channel intersecting the open end of said counterbore and communicating with the conduit of said second fitting;

a hollow tube member secured at one end in the counterbore of said first fitting and at the other end extending into the small step of the counter bore of said pole piece, said tube member having a valve port in its wall;

a magnetic plunger surrounding said tube member and slideable thereon to selectively cover and expose said valve port; and spring means for yieldably biasing said plunger away from said pole piece.

2. The valve according to claim 1 wherein said spring means includes a compression spring surrounding said tube member between said pole piece and said plunger, said compression spring fitting within the counterbore of said pole piece.

3. The valve according to claim 1 wherein the inside dimension of said plunger is sufficiently greater than the outside dimension of said tube member so that the clearance between said plunger and said tube member provides a controlled minimum flow path when said valve port is covered, said clearance providing a smaller flow rate than said valve port.

4. The valve according to claim 1 wherein said fitting conduits, said counterbore of said first fitting, and said counterbore of said pole piece are all aligned along an axis of said valve sleeve.

* * * * *